(12) United States Patent
Beerana et al.

(10) Patent No.: US 10,193,975 B2
(45) Date of Patent: Jan. 29, 2019

(54) MANAGING MULTIPLE CLOUD STORES THROUGH A WEB SERVICE

(71) Applicant: Microsoft Technology Licensing, LLC, Redmond, WA (US)

(72) Inventors: Somasundaram Kumaresan Beerana, Bellevue, WA (US); Varun Menasina Chidananda, Bellevue, WA (US); Jothikumar Rathinamoorthy, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

(21) Appl. No.: 15/066,693

(22) Filed: Mar. 10, 2016

(65) Prior Publication Data

US 2017/0264687 A1 Sep. 14, 2017

(51) Int. Cl.
*H04L 29/08* (2006.01)
*H04L 29/06* (2006.01)
*G06F 9/54* (2006.01)
*G06F 3/06* (2006.01)
(Continued)

(52) U.S. Cl.
CPC ........ *H04L 67/1097* (2013.01); *G06F 3/0604* (2013.01); *G06F 3/067* (2013.01); *G06F 3/0664* (2013.01); *G06F 9/5072* (2013.01); *G06F 9/54* (2013.01); *G06F 9/541* (2013.01);
(Continued)

(58) Field of Classification Search
CPC .... G06F 12/1408; G06F 21/14; G06F 8/4434; G06F 8/43; G06F 8/425; G06F 21/30; G06F 9/541; G06F 9/5072; G06F 3/067; G06F 9/54; G06F 3/0604; G06F 3/0664; H04L 2209/16; H04L 67/1097; H04L 67/06; H04L 63/08
See application file for complete search history.

(56) References Cited

U.S. PATENT DOCUMENTS

2010/0332454 A1* 12/2010 Prahlad ............. G06F 17/30082
707/654
2011/0047480 A1 2/2011 Venkataraman
2013/0110778 A1 5/2013 Taylor et al.
(Continued)

FOREIGN PATENT DOCUMENTS

EP 2 746 940 A1 6/2014
GB 2 502 337 A 11/2013

OTHER PUBLICATIONS

International Search Report and Written Opinion for International Patent Application No. PCT/US2017/020551, dated Jun. 22, 2017, date of filing: Mar. 3, 2017, 13 pages.
(Continued)

*Primary Examiner* — Abu S Sholeman
(74) *Attorney, Agent, or Firm* — Christopher J. Volkmann; Kelly, Holt & Christenson, PLLC

(57) ABSTRACT

A service exposes a storage system-independent application programming interface (API) and receives a data request from an application over the API. The service transforms the storage system-independent data request into a storage system-specific data request and executes it against an identified cloud-based storage system. The service can execute the request against multiple cloud-based storage systems and then return aggregated results to the application through the storage system-independent API.

8 Claims, 8 Drawing Sheets

(51) Int. Cl.
*G06F 9/50* (2006.01)
*G06F 21/30* (2013.01)

(52) U.S. Cl.
CPC .............. *G06F 21/30* (2013.01); *H04L 63/08* (2013.01); *H04L 67/06* (2013.01)

(56) References Cited

U.S. PATENT DOCUMENTS

| | | | |
|---|---|---|---|
| 2013/0290256 A1 | 10/2013 | Barrall et al. | |
| 2013/0297680 A1 | 11/2013 | Smith et al. | |
| 2013/0305039 A1* | 11/2013 | Gauda ................. | G06F 21/6218 713/153 |
| 2013/0346450 A1* | 12/2013 | Procopio ............. | G06F 21/6218 707/783 |
| 2014/0006581 A1 | 1/2014 | Raghu | |
| 2014/0052859 A1* | 2/2014 | Kruglick ................ | H04L 41/00 709/225 |
| 2014/0201824 A1* | 7/2014 | Agbabian ........... | G06F 21/6245 726/6 |
| 2014/0297700 A1 | 10/2014 | Vongsouvanh et al. | |
| 2014/0344456 A1 | 11/2014 | Buzbee et al. | |
| 2015/0154418 A1* | 6/2015 | Redberg ............ | G06F 17/30106 713/165 |
| 2016/0321311 A1* | 11/2016 | Tallamraju ........ | G06F 17/30233 |

OTHER PUBLICATIONS

"MultCloud—Combine Onedrive, Dropbox and Google Drive Accounts All Together", Published on: Aug. 29, 2014 Available at: https://www.multcloud.com/tutorials/combine-onedrive-dropbox-googledrive.html.

"CloudBuckit!", Retrieved on: Oct. 14, 2015 Available at: https://www.cloudbuckit.com/.

"Primadesk—Cloud File Manager & Explorer", Retrieved on: Oct. 14, 2015 Available at: https://play.google.com/store/apps/details?id=com.primadesk.primadeskclient&feature=search_result.

"CloudFuze—Supported Cloud Services", Published on: Jun. 25, 2014 Available at: https://www.cloudfuze.com/.

"Otixo", Published on: Apr. 13, 2015 Available at: https://itunes.apple.com/in/app/otixo/id659381221?mt=8.

Srijanya, et al., "Data Integrity Verification by Third Party Auditor in Remote Data Cloud", In International Journal of Soft Computing and Engineering, vol. 3, Issue 5, Nov. 2013, pp. 188-193.

Wallen, Jack, "Five Tools to Help Sync more than One Cloud Storage Service", Published on: May 2, 2013 Available at: http://www.techrepublic.com/blog/five-apps/five-tools-to-help-sync-more-than-one-cloud-storage-service/.

* cited by examiner

MANAGING MULTIPLE CLOUD STORES THROUGH A WEB SERVICE

BACKGROUND

Computer systems are currently in wide use. Some computer systems allow a user to store and manage data in a remote server environment. For instance, some computers allow a user to store and manage data in one or more cloud-based storage systems.

Often, each of the cloud-based storage systems has its own interface. In order to access data on such systems, the user often needs to authenticate himself or herself to each of the individual cloud-based storage systems where the user has data, and then individually access and manage his or her data on each of the could-based storage systems.

In order to at least somewhat alleviate this issue, some work has recently been done in providing a more convenient user interface for a user in accessing such systems. For instance, some work has been done in providing a consolidated user interface which allows a user to see a plurality of different cloud-based storage systems on which the user has data. From that consolidated user interface, the user can select the individual cloud-based storage systems and access and manage data on the selected system, through the consolidated user interface. However, these types of user interfaces often simply navigate the user to the specific interface for the selected cloud-based storage system, and the user then still needs to access and manage the data on that cloud-based storage system, using its specific interface, separately from the other systems The discussion above is merely provided for general background information and is not intended to be used as an aid in determining the scope of the claimed subject matter.

SUMMARY

A service exposes a storage system-independent application programming interface (API) and receives a data request from an application over the API. The service transforms the storage system-independent data request into a storage system-specific data request and executes it against an identified cloud-based storage system. The service can execute the request against multiple cloud-based storage systems and then return aggregated results to the application through the storage system-independent API.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
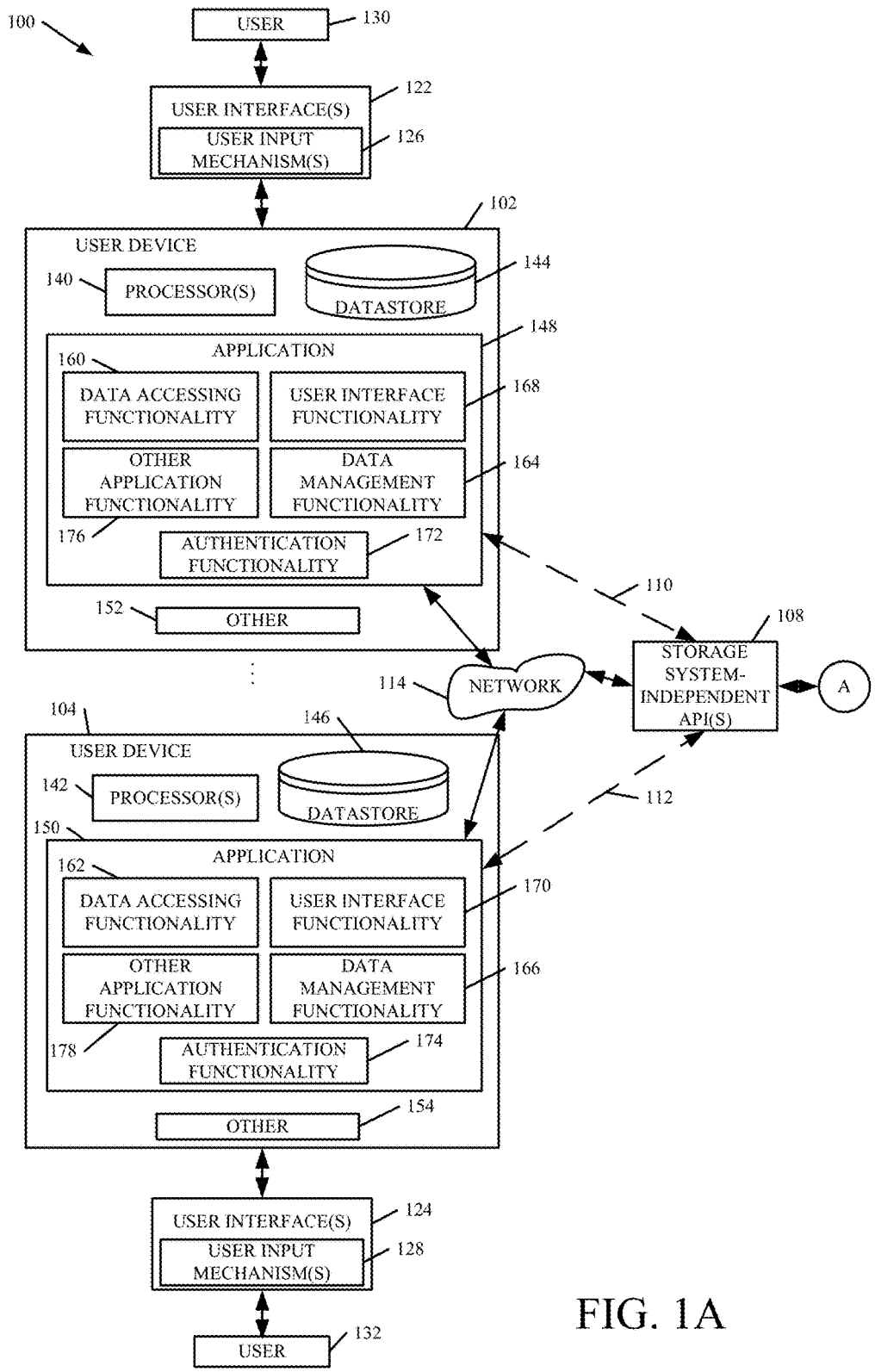
FIGS. 1A and 1B (collectively referred to herein as FIG. 1) show a block diagram of one example of a storage system management architecture.
Figure 1B:
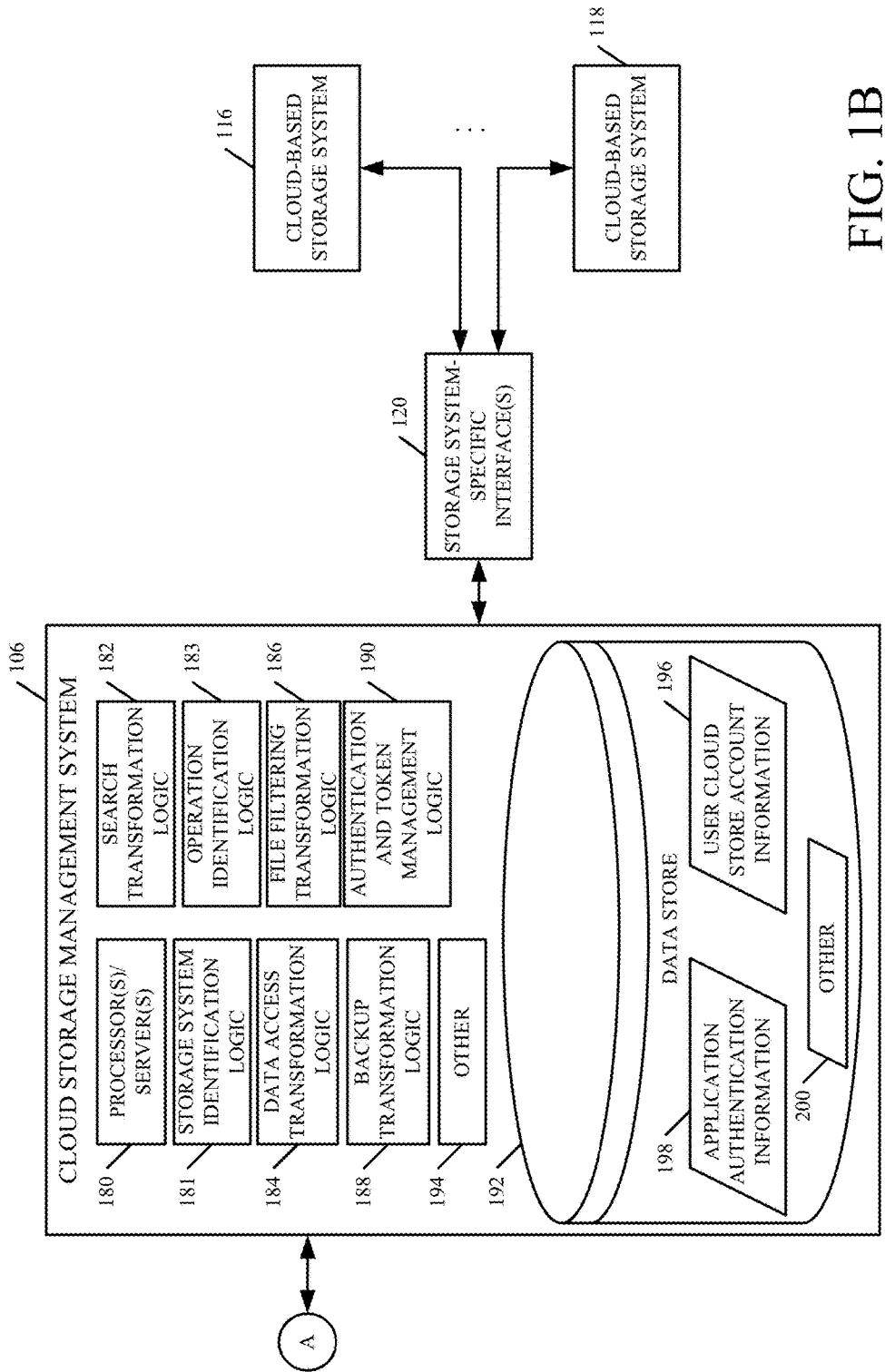

FIGS. 1A and 1B (collectively referred to herein as FIG. 1) show is a block diagram of one example of a storage system management architecture 100. Architecture 100 illustratively includes one or more user devices 102-104 that communicate with cloud storage management system 106 through a set of storage system-independent application programming interfaces (APIs) 108. Devices 102 and 104 can communicate through APIs 108 either directly (as indicated by arrows 110 and 112) or through network 114. Network 114 can be a wide area network, a local area network, or a variety of other types of networks.

Cloud storage management system 106, itself, illustratively communicates with a plurality of different cloud-based storage systems 116-118. Each of the systems 116-118 illustratively has its own storage system-specific interface 120, and system 106 communicates with the cloud-based storage systems 116-118 through their own storage system-specific interfaces 120.

Architecture 100 shows that the user devices 102-104 illustratively generate user interfaces 122-124, each of which has one or more user input mechanisms 126-128, for interaction by users 130-132. Users 130-132 illustratively interact with user input mechanisms 126-128, in order to control and manipulate user devices 102 and 104, as well as cloud storage management system 106 and ultimately cloud-based storage systems 116-118. Each user input device 102-104 illustratively includes one or more processors 140-142, data stores 144-146, one or more applications 148-150, and they can include a wide variety of other items 152-154.

Each application is illustratively an application that accesses data of the corresponding user, and manipulates that data in order to perform some type of functionality. Thus, each application may have data accessing functionality 160-162, data management functionality 164-166, user interface functionality 168-170, authentication functionality 172-174, and each application can include a wide variety of other functionality 176-178. For the sake of the present description, application 148 will be described in more detail, although application 150 can be a similar, or different application.

Data accessing functionality 160 illustratively accesses the user's data, through cloud storage management system 106, on any of the various cloud-based storage systems 116-118 where the user has an account, and has data stored. The data access functionality 160 can be used to create, read, update and delete data from the various cloud-based storage systems 116-118 (again through cloud storage management system 106). Data management functionality 164 illustratively allows the user to perform data management functions on his or her data, and authentication functionality 172 illustratively allows the user to perform a single authentication with application 148. Application 148, in turn, authenticates with cloud storage management system 106 to authenticate the user to system 106 and to the various cloud-based storage systems 116-118 so the application 148 can access the user's data. User interface functionality 168 illustratively generates the user interfaces 122 for user 130. Again, it will be noted that application 148 illustratively accesses storage system-independent APIs 108, in order to gain access to the user's data. Thus, the application 148 need only be configured to use one set of APIs 108, instead of all of the storage system-specific interfaces 120, for the various cloud-based storage systems 116-118 where the user has data.

Cloud storage management system 106, in the example shown in FIG. 1, illustratively includes one or more servers or processors 180, storage system identification logic 181, search transformation logic 182, operation identification logic 183, data access transformation logic 184, file filtering transformation logic 186, backup transformation logic 188, authentication and token management logic 190, data store 192, and it can include a variety of other items 194. Data store 192 can include cloud store account information 196 that stores information identifying the cloud-based storage system accounts of the individual users. This information can include authentication information that the user would otherwise use to authenticate himself or herself to the corresponding cloud-based storage system. Data store 192 can also include application authentication information 198 that is information used to authenticate each of the applications 148-150 to cloud store management system 106. Data store 192 can include a wide variety of other information 200 as well.

Before describing the overall operation of architecture 100 in more detail, a brief description of some of the items on cloud storage management system 106 will first be provided.

Storage system identification logic 181 receives a call from an application 148-150 over APIs 108 and identifies the particular set of cloud-based storage systems 116-118 that the call is directed to (e.g., the relevant cloud-based storage systems 116-118). Operation identification logic 183 identifies the operation that is to be performed on the relevant cloud-based storage systems 116-118 as identified in the call from the application.

Authentication and token management logic 190 illustratively manages authentication between a calling application 148-150 and system 106, and between that application and the relevant cloud-based storage systems 116-118. It may be, for instance that a user 130 authenticates him or herself with an application 148. The application 148 then makes a call on behalf of the user to access or manage data on one or more of the cloud-based storage systems 116-118. Authentication and token management logic 190 can access the application authentication information 198 and user cloud store account store information 196 to generate an authentication token that can be used by the calling application to authenticate to the cloud-based storage systems 116-118. In another example, authentication and token management logic 190 handles the authentication with the cloud-based storage systems 116-118, itself, based upon the previously stored authentication information and account information 196 and 198. It this way, a given user need only authenticate once (such as to the corresponding application 148-150) and the user will have automatically authenticated to all of his or her cloud-based storage systems 116-118 which are identified in data store 192 of cloud storage management system 106. Again, because the user need not authenticate to each of his or her cloud-based storage systems individually, this saves network bandwidth, computing and memory resources and overhead, and it greatly simplifies the user experience.

When the call from the application (e.g., application 148) is identified as a search request that represents a search operation, it is provided to search transformation logic 182. The search request illustratively identifies information that the application is searching for on the user's cloud-based storage systems 116-118. Search transformation logic 182 transforms the search request that it receives through APIs 108 into one or more storage system-specific requests that are launched against the relevant storage system-specific interfaces 120 for the relevant cloud-based storage systems 116-118. Search transformation logic 182 receives the search results from the relevant cloud-based storage systems through their interfaces 120 and transforms those results into a returned result that is provided to the calling application through APIs 108.

If the call is identified as a data access request, it is provided to data access transformation logic 184. The data access request can be to perform a data access operation, such as to create, read, update or delete data from one or more of the cloud-based storage systems 116-118. Also, of note, the request can be to move data from one of the cloud-based storage systems 116-118 to another, or to distribute the data among a plurality of cloud-based storage systems 116-118. It can also be to aggregate data from a plurality of cloud-based storage systems 116-118 to a single one. All of these are contemplated herein. It will be noted that data access transformation logic 184 can do this without downloading any of that data to the particular user device where the calling application resides. In this way, the needed network bandwidth to perform such an operation is significantly reduced over some prior systems.

In any case, data access transformation logic 184 receives the storage system-independent data access request and transforms it into one or more storage system-specific requests that are executed through the relevant interfaces 120 in order to perform the data access operation on the data on the relevant cloud-based storage systems 116-118. Logic 184 can marshal the data back and forth, transforming returned data into storage system-independent form so that it can be provided over APIs 108 to the calling application.

If the call is identified as a file filter request, which represents a file filter operation, it is provided to file filtering transformation logic 186. The filter request may be, for instance, to perform a filter operation such as to identify all files of a particular file type (e.g., music, videos, images, etc.). File filtering logic 186 transforms the storage system-independent filtering request received over APIs 108 into one or more storage system-specific requests that are applied to interfaces 120 for the relevant cloud-based storage systems 116-118. Logic 186 can thus search through and filter all of the data for a given user, across all of the user's cloud-based storage systems 116-118, and return the filtered results in a storage system-independent way, to the calling application, through APIs 108.

Backup transformation logic 188 illustratively receives backup configuration requests through APIs 108. It transforms that request into one or more storage system-specific backup configuration requests that will configure one or more of the cloud-based storage systems 116-118, to back up information, as indicated by the backup configuration request. It will be noted that such a request can request an operation, such as for an individual cloud-based storage system 116-118 to generate a backup version of a set of files, on its own storage system. However, this can also request that one or more cloud-based storage systems 116-118 backup versions on a different one of the cloud-based storage systems 116-118. Backup transformation logic 188 illustratively controls the cloud-based storage systems 116-118 to perform these backup operations, without needing to download the information to be backed up to the user device 102-104 of the calling application 148-150. Again, this significantly reduces the need for network bandwidth and speeds up the backup operation as well.

Figure 2:
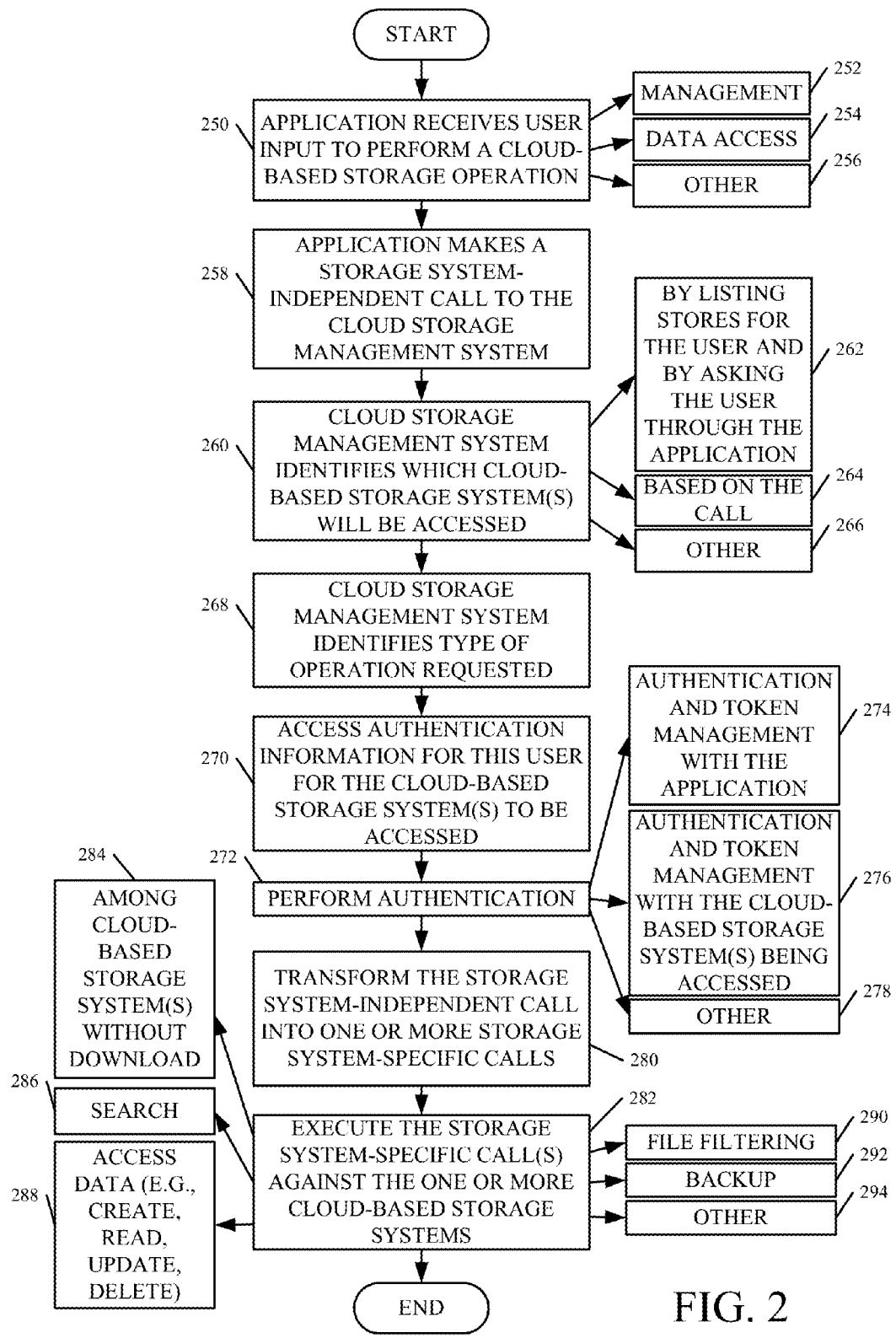
FIG. 2 is a flow diagram illustrating one example of the operation of the architecture shown in FIG. 1.

FIG. 2 is a flow diagram illustrating one example of the operation of architecture 100, in more detail. FIGS. 1 and 2 will now be described in conjunction with one another. The description will proceed with respect to the operation of application 148 in order to perform an operation on one or more cloud-based storage systems 116-118. It will be appreciated, however, that the present description could just as easily apply to application 150.

It is first assumed that user 130 has launched or otherwise enabled application 148. In one example, application 148 can either on its own initiative perform an operation on one of the cloud-based storage systems 116-118, or it can do so upon request by user 130. For the present example, it is assumed that the user 130 provides an input indicating that the user wishes to perform some type of operation on information that the user has stored on one or more of the cloud-based storage systems 116-118. Receiving such a user input at application 148 is indicated by block 250 in FIG. 2. The input can be indicative of a wide variety of different user requests. For instance, it may be a management input 252 indicating that the user wishes to perform some type of management operation on his or her data. This may be an operation in which the user creates files or folders or rearranges file hierarchies, or otherwise sets properties or performs other management operations on the user's data. The input can be indicative of a user data access request 254. This may be, for instance, to read, copy, create, update, delete, or otherwise access the user's data and perform some type of operation. Of course, the user input can be indicative of a wide variety of other requests 256 as well, and some of these are described below.

Application 148 then makes a storage system-independent call to cloud storage management system 106 using APIs 108. This is indicated by block 258 in FIG. 2. In one example, the various items in cloud storage management system 106 support APIs 108 that are exposed by system 106, so that application 148 can perform search requests, data access requests, file filtering requests, backup (or backup configuration) requests, and authentication requests, among others, through a single set of storage system-independent APIs 108. It will be noted that, because application 148 only needs to make calls to storage system-independent APIs 108, it need not implement all of the storage system-specific interfaces 120 exposed by cloud-based storage systems 116-118. As transformation components are added to system 106, for additional cloud-based storage systems, application 148 can access those cloud-based storage systems as well, without needing to know the specifics of the new storage system-specific interfaces 120.

Storage system identification logic 181 then identifies which cloud-based storage systems will be accessed, based upon the call received through its APIs 108. This is indicated by block 260. In one example, logic 181 does this by accessing the account information 196 for the user represented by application 148 to identify all of the various cloud-based storage systems 116-118 that the user has an account on. It then provides those to application 148 through APIs 108 so that they can be displayed to user 130. User input mechanisms 126 are illustratively provided as well, so that user 130 can select the particular cloud-based storage systems that the user wants access to. Listing the stores for the user and asking the user to identify the relevant stores through application 148 is indicated by block 262. In another example, however, storage system identification logic 181 can discern which particular cloud-based storage systems 116-118 are to be accessed, based upon the call, itself. For instance, the API 108 that is invoked may receive, as an input, one or more identifiers that identify the particular cloud-based storage systems 116-118 that will be affected by the call. Automatically identifying the cloud-based storage systems to be accessed based on the call is indicated by block 264 in FIG. 2. The particular, relevant cloud-based storage systems 116-118 that will be accessed based on the call can be identified in other ways as well, and this is indicated by block 266.

Operation identification logic 183 then identifies the type of operation that is being requested by application 148. This is indicated by block 268 in FIG. 2. For instance, it may be that the application is requesting to access data, to filter data, to perform other search operations, to configure backup operations, or to perform a wide variety of other operations on the cloud-based storage system. The particular type of operation is identified by logic 183, so that it can be handled by the appropriate item in management system 106.

Once the relevant cloud-based storage system (or systems) have been identified, and once the particular operation has been identified, then authentication and token management logic 190 accesses the application and user authentication and account information 196 and 198 in data store 192, so that the particular user and application can be authenticated to the relevant cloud-based data stores. Accessing this information is indicated by block 270 in FIG. 2, and performing the authentication is indicated by block 272.

In performing the authentication, logic 190 illustratively automatically authenticates the user and application to the identified cloud-based storage systems 116-118 that are relevant to the call that was received from application 148. It can do this based on authentication information that was previously received from user 130 and/or application 148, and stored in data store 192. In another example, it can perform an authentication operation so that application 148 (and/or user 130) authenticate themselves through APIs 108 to authentication and token management logic 190. Once that is done, logic 190 can perform the authentication with the identified cloud-based storage systems. In yet another example, logic 190 can conduct an authentication session between application 148 (and/or user 130) and the identified cloud-based storage systems 116-118 directly. In all of these examples, authentication and token management logic 190 illustratively handles the authentication between itself and application 148, as indicated by block 274 in FIG. 2, and between itself and the cloud-based storage system being accessed, as indicated by block 276. During the authentication process, it can ensure that the particular user or application is authorized not only to access the identified cloud-based storage systems, but also that the user or application is authorized to perform the identified operation with respect to those cloud-based storage systems. The authentication and token management logic 190 can perform authentication in other ways as well, and this is indicated by block 278.

Once the user 130 and/or application 148 are authenticated to the identified cloud-based storage systems 116-118 that will be affected by the call, then the identified operation is provided to the appropriate logic item for transformation. The appropriate logic item then transforms the storage system-independent call to a storage system-specific call so that it can be executed against interfaces 120 for the relevant storage systems 116-118. This is indicated by block 280 in FIG. 2.

This can be done in a wide variety of different ways. For instance, each of the logic items 182-190 in cloud storage management system 106 may have a separate set of mappings that map from the calls received through APIs 108 to the storage system-specific interfaces 120 for the various, supported, cloud-based storage systems 116-118. Each of the logic items can then access those mappings, once the identified operation is received, in order to perform the requested operation on the identified cloud-based storage system. In another example, the transformation can be performed by accessing a central set of mappings, or by dynamically computing the storage system-specific call from the storage system-independent call. All of these, and other mechanisms, are contemplated herein.

Once the call to perform the operation has been transformed to the storage system-specific call, it is then executed against the one or more cloud-based storage systems 116-118, through their respective interfaces 120. This is indicated by block 282. It will be noted that the request may not involve the application 148 directly accessing any of the information on cloud-based storage systems 116-118. Instead, for instance, the request may be to move information from one system 116 to another system 118. In that case, the particular logic item can do this without ever downloading the data to the device running application 148. This can be particularly useful in various scenarios. For instance, if the user device 102 that is running application 148 is a mobile device, downloading a relatively large file can increase memory usage, bandwidth usage, and other processing overhead. If the file can simply be moved from one cloud-based storage system 116 to another, without ever having to download it, this can speed up the operation and conserve on the various types of processing and memory overhead that may otherwise be used to perform that operation. Performing the operation among cloud-based storage systems 116-118, without ever downloading the file or other data is indicated by block 284 in FIG. 2.

If operation identification logic 183 identifies the requested operation as a search operation, then it is provided to search transformation logic 182. Transformation logic 182 transforms the search request into a storage system-specific request that can be launched against interfaces 120. Again, it will be noted that the request may identify multiple different cloud-based storage systems 116-118. This may be the case, for instance, where application 148 is searching for information for the present user, across all of the user's cloud storage accounts. In that case, search transformation logic 182 transforms the search request into multiple independent storage system-specific requests that can be executed against the interfaces 120 for the various different cloud-based storage systems 116-118 that are to be searched. Performing the search operation is indicated by block 286.

If operation identification logic 183 has identified the operation as a data access request (such as a request to create, read, update, delete, etc.) on a file or files on one or more cloud-based storage systems 116-118, then the request is provided to data access transformation logic 184. Logic 184 transforms the data access request into one or more storage system-specific requests that can be executed against interfaces 120 for the relevant cloud-based storage systems 116-118. Transforming and executing a data access request is indicated by block 288 in FIG. 2.

It may also be that operation identification logic 183 identifies the operation as a filtering operation. For instance, it may be that application 148 wishes to obtain (such as download or otherwise access) a list of files of the user, that is filtered based on certain filter criteria. By way of example, the list of files may be filtered to identify the type of file (such as image, music, video, text, etc.). Of course, the filter criteria can be a wide variety of other filter criteria as well. In that case, file filtering transformation logic 186 transforms the request into one or more storage system-specific requests that can be executed against the interfaces 120 for the one or more relevant cloud-based storage systems 116-118. Transforming and executing a file filtering request is indicated by block 290 in FIG. 2.

If operation identification logic 183 identifies the requested operation as a backup request, or backup configuration request, the operation can be provided to backup transformation logic 188. Backup transformation logic 188 then illustratively transforms the request into one or more storage system-specific requests that can be executed against the interfaces 120 where the backup operation or configuration is to take place. Transforming and performing a backup operation is indicated by block 292.

It will be noted that the operations can be a wide variety of other operations as well. Transformation can be provided to transform those requested operations into storage system-specific operations for the relevant cloud-based storage systems. This is indicated by block 294.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 3:
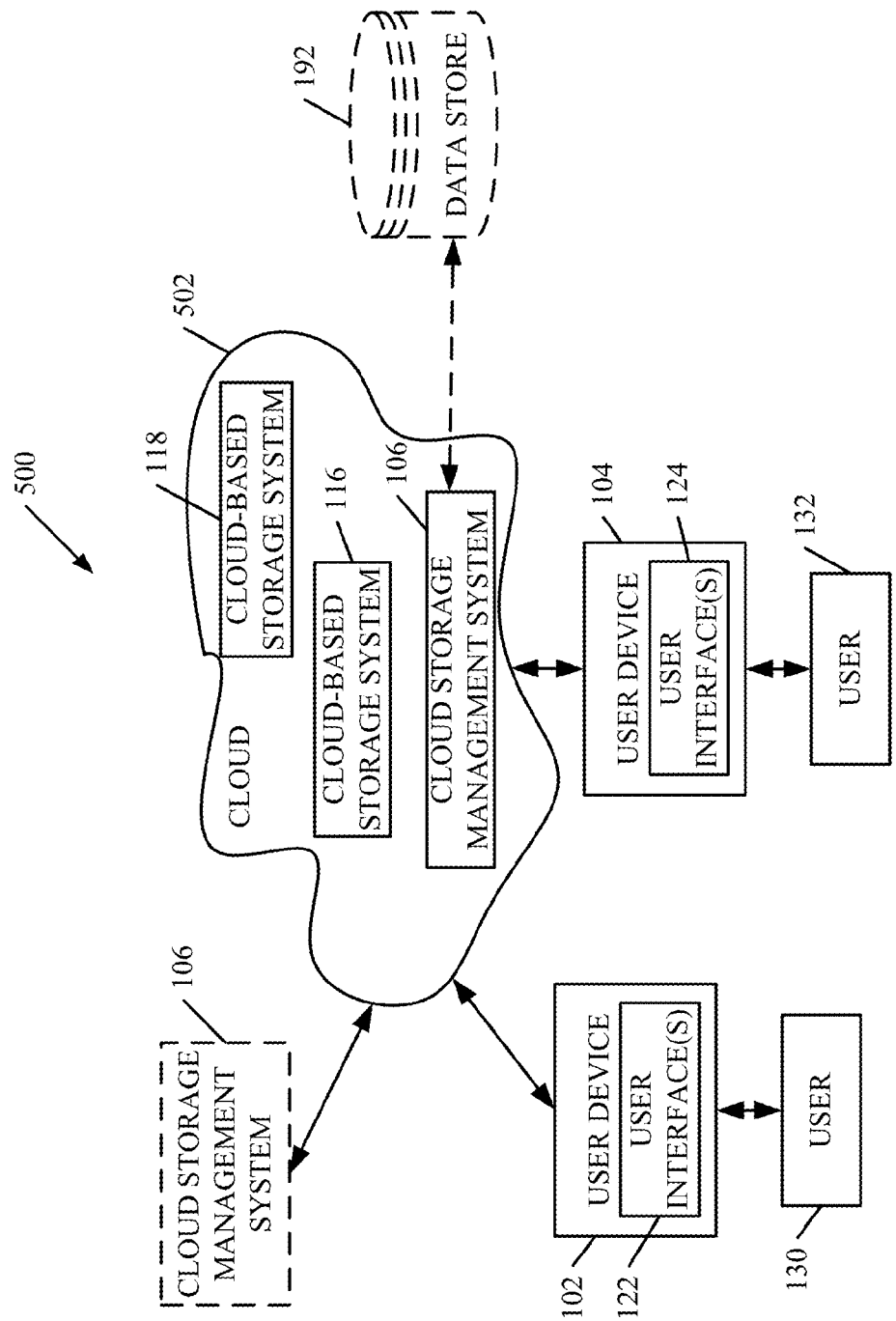
FIG. 3 is a block diagram in which the cloud storage management system is, itself, deployed in the cloud.

FIG. 3 is a block diagram of architecture 100, shown in FIG. 1, except that system 106 is also disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 3, some items are similar to those shown in FIG. 1 and they are similarly numbered. FIG. 3 specifically shows that systems 106, 116-118 can all be located in cloud 502 (which can be public, private, or a combination where portions are public while others are private). Therefore, users 130-132 use user devices 102-104 to access those systems through cloud 502.

FIG. 3 also depicts another example of a cloud architecture. FIG. 3 shows that it is also contemplated that some elements of architecture 100 are disposed in cloud 502 while others are not. By way of example, data store 192 can be disposed outside of cloud 502, and accessed through cloud 502. In another example, system 106 can be outside of cloud 502. Regardless of where they are located, they can be accessed directly by devices 102-104, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 4:
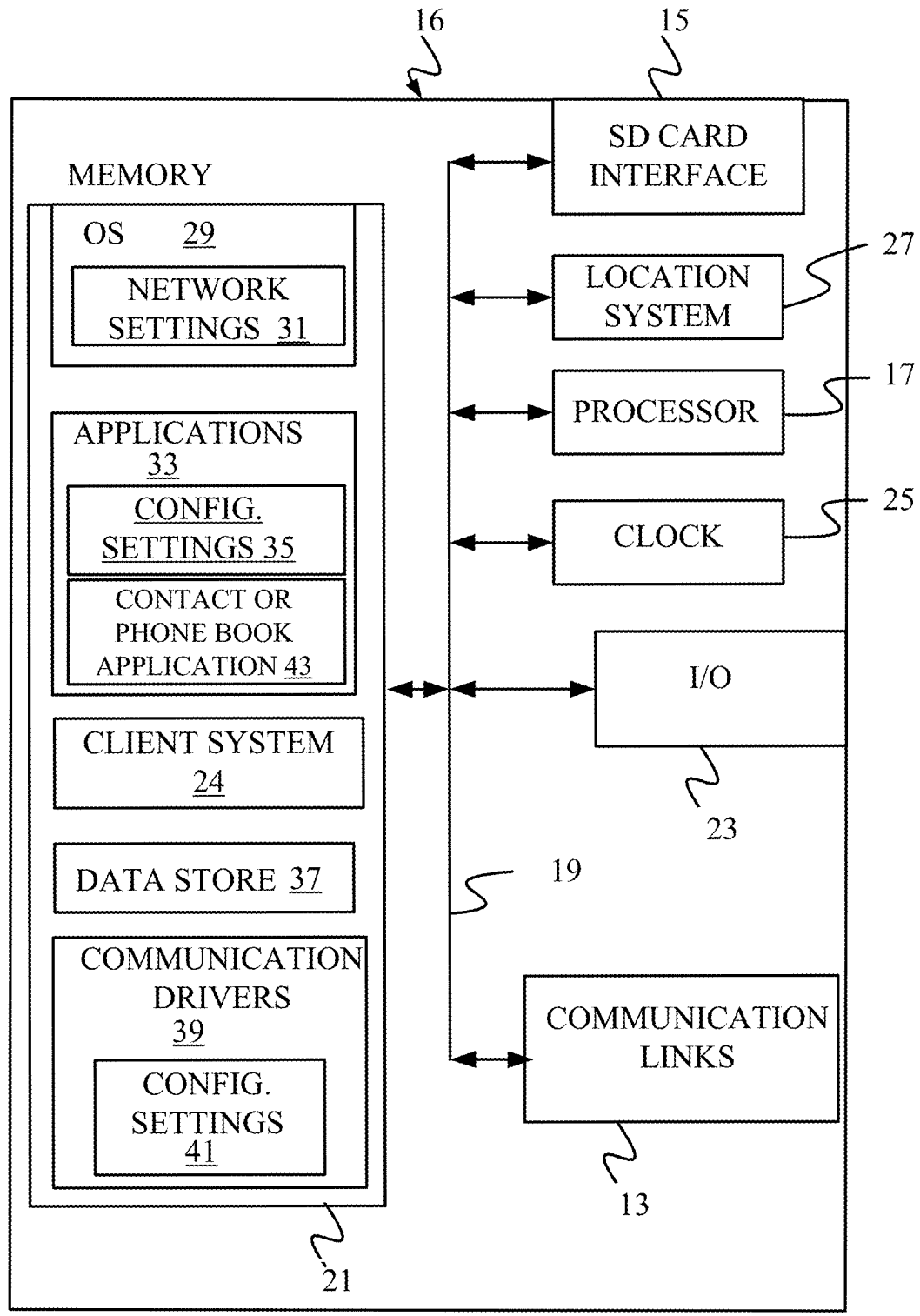
FIGS. 4-6 show examples of mobile devices that can be used in the architectures illustrated in the previous figures.
Figure 5:
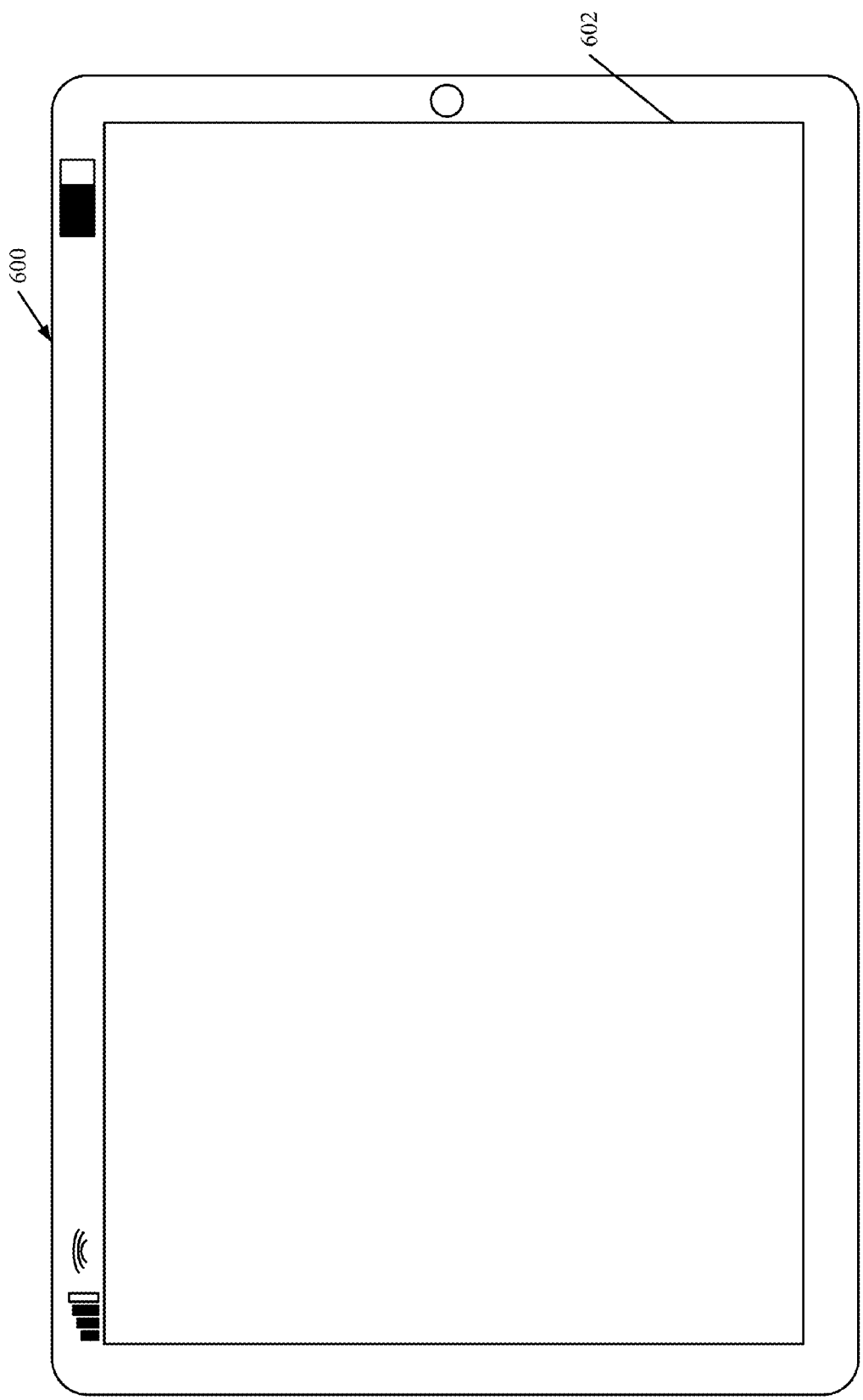
Figure 6:
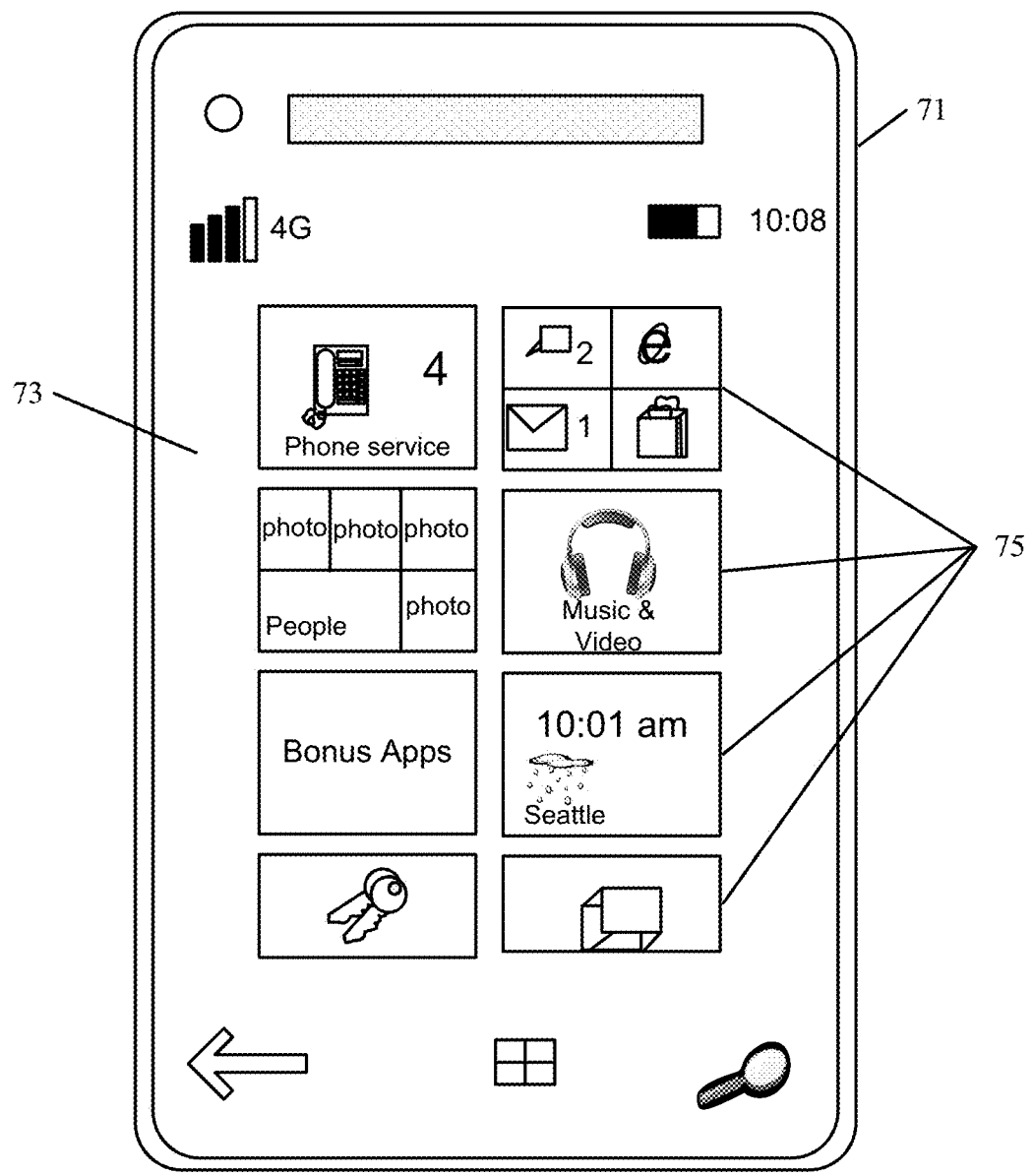

FIG. 4 is a simplified block diagram of one illustrative example of a handheld or mobile computing device that can be used as a user's or client's hand held device 16, in which the present system (or parts of it) can be deployed. FIGS. 5-6 are examples of handheld or mobile devices.

FIG. 4 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors shown in previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications 148-150 or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 5 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1×rtt, and Short Message Service (SMS) signals. In some examples the phone also includes a Secure Digital (SD) card slot that accepts a SD card.

FIG. 6 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 7:
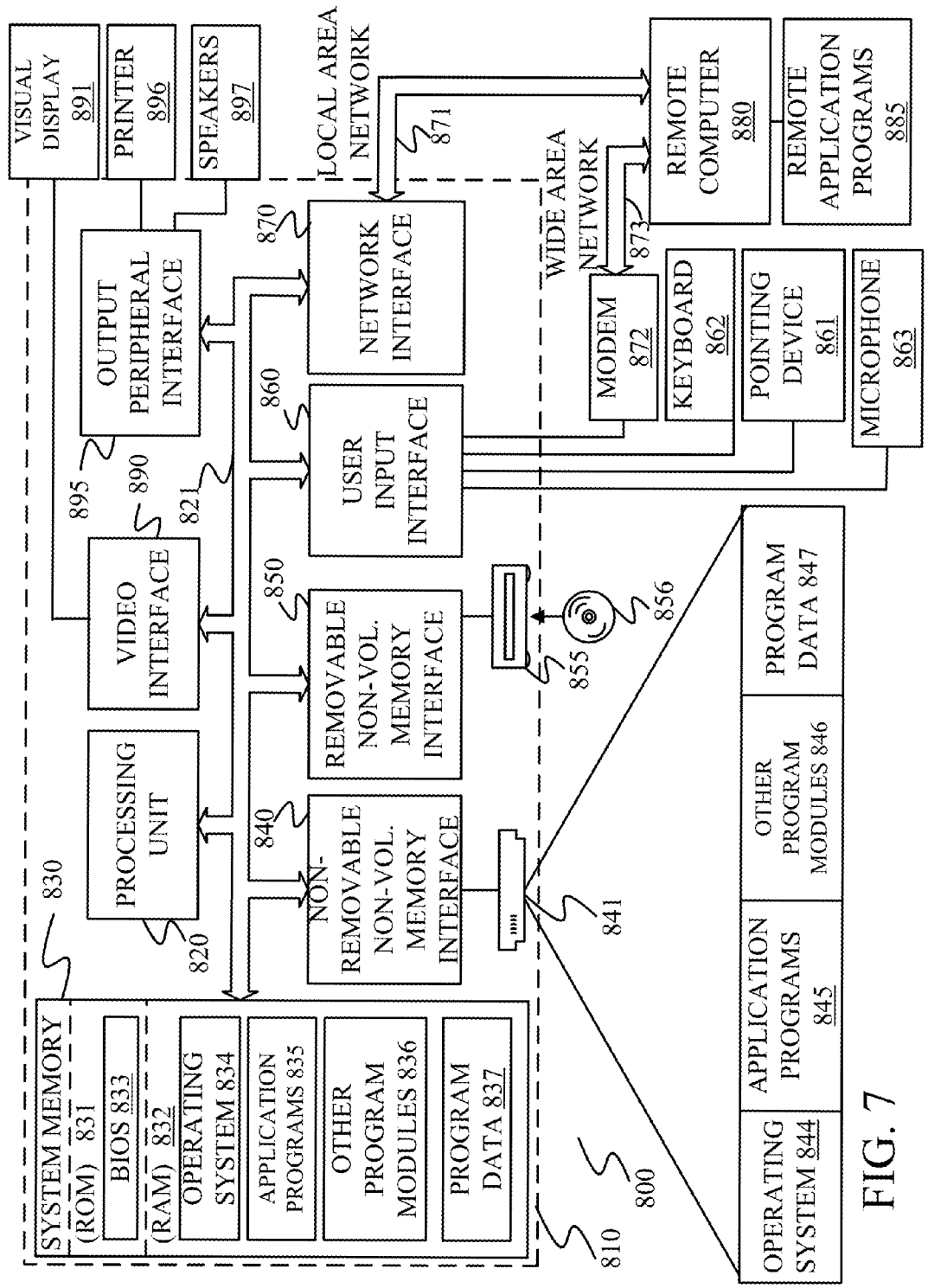
FIG. 7 is a block diagram showing one example of a computing environment that can be used in the architectures illustrated in the previous figures.

FIG. 7 is one example of a computing environment in which architecture 100, or parts of it, (for example) can be deployed. With reference to FIG. 7, an example system for implementing some embodiments includes a general-purpose computing device in the form of a computer 810. Components of computer 810 may include, but are not limited to, a processing unit 820 (which can comprise processors shown in previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, a and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a cloud storage management system that exposes a storage system-independent application programming interface that is invoked by an application to make a call to perform an operation on a cloud-based storage system corresponding to a user;

authentication logic that performs an authentication operation to authenticate the application to the cloud-based storage system; and operation transformation logic that transforms the call into a storage system-specific call and executes the storage system-specific call against a storage system-specific interface to perform the operation on the cloud-based storage system.

Example 2 is the computing system of any or all previous examples wherein the cloud storage management system further comprises:
storage system identification logic that identifies the cloud-based storage system as a plurality of different, relevant cloud-based storage systems, corresponding to the user, on which the operation is to be performed, each of the different, relevant cloud-based storage systems implementing a different corresponding storage system-specific interface.

Example 3 is the computing system of any or all previous examples wherein the operation transformation logic is configured to transform the call into a plurality of storage system-specific calls and execute the storage system-specific calls against the corresponding storage system-specific interfaces to perform the operation on the plurality of relevant cloud-based storage systems.

Example 4 is the computing system of any or all previous examples wherein the call indicates a data access request to move an identified file from a first of the plurality of cloud-based storage systems to a second of the plurality of cloud-based storage systems and wherein the operation transformation logic is configured to perform the operation by moving the identified file from the first cloud-based storage system to the second cloud-based storage system without downloading the file to the application.

Example 5 is the computing system of any or all previous examples wherein the call comprises a search request indicative of a search and wherein the operation transformation logic comprises:
search transformation logic that transforms the call into a plurality of different storage system-specific search requests and executes the plurality of storage system-specific search requests against the corresponding storage system-specific interfaces to perform the search on the plurality of different, relevant cloud-based storage systems.

Example 6 is the computing system of any or all previous examples wherein the call comprises a data access request indicative a request to perform a data access operation on data on the plurality of different, relevant cloud-based storage systems and wherein the operation transformation logic comprises:
data access transformation logic that transforms the call into a plurality of different storage system-specific data access requests and executes the plurality of storage system-specific data access requests against the corresponding storage system-specific interfaces to perform the data access operation on the plurality of different, relevant cloud-based storage systems.

Example 7 is the computing system of any or all previous examples wherein the call comprises a data distribution request indicative of a data distribution operation to distribute data corresponding to the user across the plurality of different, relevant cloud-based storage systems, the data access transformation logic being configured to transform the call into a plurality of different storage system-specific data distribution requests and execute the plurality of storage system-specific data distribution requests against the corresponding storage system-specific interfaces to perform the data distribution operation on the plurality of different, relevant cloud-based storage systems.

Example 8 is the computing system of any or all previous examples wherein the call comprises a file filtering request indicative of a file filtering operation and wherein the operation transformation logic comprises:

file filtering transformation logic that transforms the call into a plurality of different storage system-specific file filtering requests and executes the plurality of storage system-specific file filtering requests against the corresponding storage system-specific interfaces to perform the file filtering operation on the plurality of different, relevant cloud-based storage systems.

Example 9 is the computing system of any or all previous examples wherein the call comprises a backup request indicative of a backup operation and wherein the operation transformation logic comprises:

backup transformation logic that transforms the call into a plurality of different storage system-specific backup requests and executes the plurality of storage system-specific backup requests against the corresponding storage system-specific interfaces to perform the backup operation on the plurality of different, relevant cloud-based storage systems.

Example 10 is a computer implemented method, comprising:

detecting invocation of an exposed storage system-independent application programming interface (API), invoked by an application to make a call to perform an operation on a cloud-based storage system corresponding to a user;

performing an authentication operation to authenticate the application to the cloud-based storage system;

transforming the call into a storage system-specific call; and executing the storage system-specific call against a storage system-specific interface to perform the operation on the cloud-based storage system.

Example 11 is the computer implemented method of any or all previous examples wherein detecting invocation of the exposed storage system-independent API comprises:

identifying the cloud-based storage system as a plurality of different, relevant cloud-based storage systems, corresponding to the user, on which the operation is to be performed, each of the different, relevant cloud-based storage systems implementing a different corresponding storage system-specific interface.

Example 12 is the computer implemented method of any or all previous examples wherein transforming comprises:

transforming the call into a plurality of storage system-specific calls and wherein executing comprises executing the storage system-specific calls against the corresponding storage system-specific interfaces to perform the operation on the plurality of relevant cloud-based storage systems.

Example 13 is the computer implemented method of any or all previous examples wherein the call indicates a data access request to move an identified file from a first of the plurality of cloud-based storage systems to a second of the plurality of cloud-based storage systems and wherein executing comprises:

performing the operation by moving the identified file from the first cloud-based storage system to the second cloud-based storage system without downloading the file to a device running the application.

Example 14 is the computer implemented method of any or all previous examples wherein the call comprises a search request indicative of a search and wherein transforming comprises:

transforming the call into a plurality of different storage system-specific search requests and wherein executing comprises executing the plurality of storage system-specific search requests against the corresponding storage system-specific interfaces to perform the search on the plurality of different, relevant cloud-based storage systems.

Example 15 is the computer implemented method of any or all previous examples wherein the call comprises a data access request indicative of a request to perform a data access operation on data on the plurality of different, relevant cloud-based storage systems and wherein transforming comprises:

transforming the call into a plurality of different storage system-specific data access requests and wherein executing comprises executing the plurality of storage system-specific data access requests against the corresponding storage system-specific interfaces to perform the data access operation on the plurality of different, relevant cloud-based storage systems.

Example 16 is the computer implemented method of any or all previous examples wherein the call comprises a data distribution request indicative of a data distribution operation to distribute data corresponding to the user across the plurality of different, relevant cloud-based storage systems, wherein transforming comprises:

transforming the call into a plurality of different storage system-specific data distribution requests and wherein executing comprises executing the plurality of storage system-specific data distribution requests against the corresponding storage system-specific interfaces to perform the data distribution operation on the plurality of different, relevant cloud-based storage systems.

Example 17 is the computer implemented method of any or all previous examples wherein the call comprises a file filtering request indicative of a file filtering operation and wherein transforming comprises:

transforming the call into a plurality of different storage system-specific file filtering requests and wherein executing comprises executing the plurality of storage system-specific file filtering requests against the corresponding storage system-specific interfaces to perform the file filtering operation on the plurality of different, relevant cloud-based storage systems.

Example 18 is the computer implemented method of any or all previous examples wherein the call comprises a backup request indicative of a backup operation and wherein transforming comprises:

transforming the call into a plurality of different storage system-specific backup requests and wherein executing comprises executing the plurality of storage system-specific backup requests against the corresponding storage system-specific interfaces to perform the backup operation on the plurality of different, relevant cloud-based storage systems.

Example 19 is a computing system, comprising:

a cloud storage management system that exposes a storage system-independent application programming interface that is invoked by an application to make a call to perform an operation on a cloud-based storage system corresponding to a user;

storage system identification logic that identifies a plurality of different, relevant cloud-based storage systems, corresponding to the user, on which the operation is to be performed, each of the different, relevant cloud-based storage systems implementing a different corresponding storage system-specific interface;

authentication logic that performs an authentication operation to authenticate the application to the plurality of different, relevant cloud-based storage systems; and operation transformation logic that transforms the call into a plurality of different storage system-specific calls, corresponding to the plurality of different, relevant cloud-based storage systems, and executes each of the plurality of different storage system-specific calls against a corresponding one of the plurality of storage system-specific interfaces to perform the operation on the plurality of different, relevant cloud-based storage systems.

Example 20 is the computing system of any or all previous examples wherein the call comprises a data distribution request indicative of a data distribution operation to distribute data corresponding to the user across the plurality of different, relevant cloud-based storage systems, the operation transformation logic being configured to transform the call into a plurality of different storage system-specific data distribution requests and execute the plurality of storage system-specific data distribution requests against the corresponding storage system-specific interfaces to perform the data distribution operation on the plurality of different, relevant cloud-based storage systems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor; and
memory storing instructions executable by the processor, wherein the instructions, when executed, configure the computing system to:
receive, from a client device through a storage system-independent application programming interface, a call that is associated with an application on the client device and indicates a data access request to move an identified file from a first cloud-based storage system to a second cloud-based storage system, wherein
the first cloud-based storage system implements a first storage system-specific interface, and
the second cloud-based storage system implements a second storage system-specific interface that is different than the first storage system-specific interface;
perform an authentication operation to authenticate the application to the first cloud-based storage system;
transform the call into a storage system-specific call that is configured in accordance with the first storage system-specific interface; and
execute the storage system-specific call against the first storage system-specific interface to perform the operation, by moving the identified file from the first cloud-based storage system to the second cloud-based storage system without downloading the identified file to the client device.

2. The computing system of claim 1 wherein the instructions configure the computing system to:
receive a second call comprising a search request indicative of a search;
transform the second call into a plurality of different storage system-specific search requests; and
execute the plurality of storage system-specific search requests against the first and second storage system-specific interfaces to perform the search on the first and second cloud-based storage systems.

3. The computing system of claim 1 wherein the instructions configure the computing system to:
receive a second call comprising a data access request indicative a request to perform a data access operation on data on the plurality of different cloud-based storage systems;
transform the second call into a plurality of different storage system-specific data access requests; and
execute the plurality of storage system-specific data access requests against the first and second storage system-specific interfaces to perform the data access operation on the first and second cloud-based storage systems.

4. The computing system of claim 1 wherein the instructions configure the computing system to:
receive a second call comprises a data distribution request indicative of a data distribution operation to distribute data corresponding to a user across the first and second cloud-based storage systems;
transform the second call into a plurality of different storage system-specific data distribution requests; and
execute the plurality of storage system-specific data distribution requests against the first and second storage system-specific interfaces to perform the data distribution operation on the first and second cloud-based storage systems.

5. The computing system of claim 1 wherein the instructions configure the computing system to:
receive a second call comprises a file filtering request indicative of a file filtering operation;
transform the second call into a plurality of different storage system-specific file filtering requests; and
execute the plurality of storage system-specific file filtering requests against the first and second storage system-specific interfaces to perform the file filtering operation on the first and second cloud-based storage systems.

6. The computing system of claim 1 wherein the instructions configure the computing system to:
receive a second call comprises a backup request indicative of a backup operation;
transform the second call into a plurality of different storage system-specific backup requests; and
execute the plurality of storage system-specific backup requests against the first and second storage system-specific interfaces to perform the backup operation on the first and second cloud-based storage systems.

7. A computing system, comprising:
a processor; and
memory storing instructions executable by the processor, wherein the instructions, when executed, configure the computing system to:
receive, from an application through a storage system-independent application programming interface, a call to perform a data distribution operation to distribute data corresponding to a user across a plurality of different cloud-based storage systems, each of the cloud-based storage systems implementing a different corresponding storage system-specific interface;
perform an authentication operation to authenticate the application to the plurality of different cloud-based storage systems; and transform the call into a plurality of different storage system-specific data distribution requests, wherein each storage system-specific data distribution request:
- corresponds to one of the plurality of different cloud-based storage systems, and
- is configured in accordance with the storage system-specific interface implemented by the corresponding cloud-based storage system; and execute each of the plurality of different storage system-specific data distribution requests against the corresponding one of the plurality of storage system-specific interfaces to perform the data distribution operation on the plurality of different cloud-based storage systems.

8. The computing system of claim 7 wherein the instructions, when executed, configure the computing system to:
receive from the application, through the storage system-independent application programming interface, a second call to perform a file filtering operation, the second call including a filter criterion for the file filtering operation;

transform the second call into a plurality of different storage system-specific file filtering requests, wherein each storage system-specific file filtering requests:
- corresponds to one of the plurality of different cloud-based storage systems,
- includes the filter criterion, and
- is configured in accordance with the storage system-specific interface implemented by the corresponding cloud-based storage system;

execute each of the plurality of different storage system-specific file filtering requests against a corresponding one of the plurality of storage system-specific interfaces to perform the file filtering operation on the plurality of different cloud-based storage systems; and receive filter results, indicative of the file filtering operation performed on the plurality of different cloud-based storage systems, through the plurality of storage system-specific interfaces.

* * * * *